INVENTOR.
John Sohn Wolfe

United States Patent Office 2,980,475
Patented Apr. 18, 1961

2,980,475
LUBRICANT SYSTEM

John Sohn Wolfe, Dayton, Ohio, assignor to General Motors Corporation, Detroit, Mich., a corporation of Delaware Filed July 11, 1958, Ser. No. 747,989
7 Claims. (Cl. 308—240)

This invention relates to a lubricant system and is particularly concerned with a high temperature lubricant for use in the system in connection with specific types of bearings.

It is difficult to provide instrumentalities which must function under elevated temperature conditions with suitable bearings and bearing lubricants whereby these instrumentalities frequently have very short lives and low efficiency. Specifically, electric motors, for example, which must operate at temperatures up to 1000° F. are difficult to maintain due to the fact that conventional bearings and bearing lubricants will not function at their required temperatures of operation.

This invention is directed specifically to a lubricating system involving high temperature bearing materials and lubricants which are useful at elevated temperature conditions up to 1000° F.

It is, therefore, the main object of this invention to provide a lubricant system and a lubricant for use in said system which is operable at temperatures up to 1000° F.

In carrying out this object, it is a further object to provide a lubricant for the system consisting of a mixture of hexagonal boron nitride and a gallium base alloy.

More specifically, it is an object of the invention to provide a lubricant consisting of a major portion of hexagonal boron nitride and a minor portion of a low melting point alloy of gallium base alloy wherein indium, tin and silver are present in progressively decreasing amounts.

Further objects and advantages of the present invention will be apparent from the following description, reference being had to the accompanying drawings wherein preferred embodiments of the present invention are clearly shown.

Figure 1:
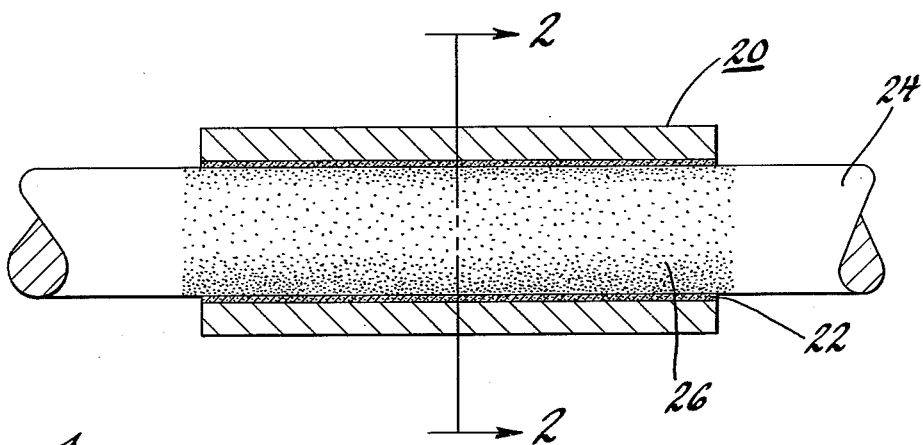
Figure 1 is a view of a bearing with a shaft journalled therein.
Figure 2:
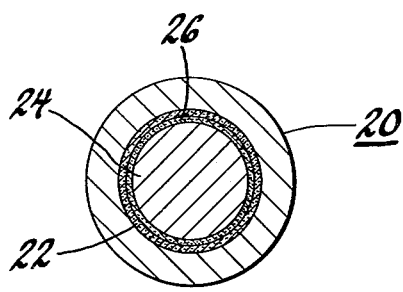
Figure 2 is a section taken on line 2—2 of Figure 1.

Referring specifically to Figure 1, 20 shows a bearing made from metallic material such as steel which includes an inner sleeve comprising a bearing surface 22 at the journal portion thereof. This surface 22 is formed from fused aluminum oxide and is preferably ground to approximately 5 micro inches R.M.S. at the bearing surface.

The shaft 24 which is journalled in the bearing 20 may be made of steel and this shaft is provided with a surface at 26 of fused aluminum oxide (shown by stippling) flame-sprayed onto a rough machined surface on the shaft and ground to a fine surface finish, for example, in the order of 5 micro inches R.M.S. The thickness of the oxide coating on the shaft is in the neighborhood of 20 to 25 thousandths of an inch.

The application of aluminum oxide by flame-spraying operations is well known to the art as are the controls thereof for thickness of layer, etc.

In either instance, the bearing and shaft may also be formed from a carbide material such as tungsten carbide wherein a similar finish is ground thereon. Other metallic carbides of comparable cost and character may be used as desired. However, in most instances, the aluminum oxide surface is more desirable due to cost considerations but this, in many instances, is dictated by size and, where a very small diameter bearing and shaft are used, the tungsten carbide may be of comparable cost.

The bearing 20 preferably has a spiral groove, not shown, machined in the surface thereof extending longitudinally of the bearing to act as a lubricant well and this well is filled with a lubricant and the surface of the bearing is smeared with a lubricant which will withstand the temperature of operation of the device.

The lubricant used is a combination of hexagonal boron nitride and a low melting point gallium base alloy. This alloy is preferably used in proportions of 1 part by weight of the alloy to 5 parts by weight of the boron nitride in the preferred embodiment although these proportions may vary within limits to obtain desired results without deviating from the concept of my invention.

The gallium alloy preferred is a low melting alloy involving the four metals which has a composition of approximately 63% gallium, 25% indium, 10% tin and 2% silver. This alloy has a melting point in the order of 40° F. and a boiling point which is above 2000° F. It is particularly adapted as a lubricant additive in the present instance since it wets aluminum oxide readily. While it attacks most common metals when it is hot, it is compatible with most glasses, ceramics and metallic carbides and, therefore, such metal carbides as tungsten carbide may be used as thrust washers if thrust problems are involved in the bearing application. This gallium alloy is substantially nontoxic which makes possible its use in most applications in conjunction with the boron nitride. Lubricant systems as defined herein have many applications in addition to use with motors for high temperature use. Another important application is in gas turbines where sealing surfaces and bearing surfaces may use the high temperature qualities of the system.

It is apparent that continued operation of the system and lubricant at high temperatures depends upon the environment atmosphere and that oxidizing gases must not be present. For this reason, the use of reducing, neutral or nonoxidizing and nondeleterious gases or in vacuo conditions is mandatory at elevated temperatures.

While the embodiments of the present invention as herein disclosed constitute preferred forms, it is to be understood that other forms might be adopted.

What is claimed is as follows:

1. A lubricant system adapted to operate at temperatures above 500° F., comprising; smooth mating bearing surfaces taken from the class consisting of glass, ceramics, metallic carbides and aluminum oxide and a lubricant for said surfaces consisting of a mixture of hexagonal boron nitride and a gallium base alloy.

2. A lubricant system adapted to operate at temperatures above 500° F., comprising; smooth mating bearing surfaces taken from the class consisting of glass, ceramics, metallic carbides and aluminum oxide, and a lubricant for said surfaces consisting of hexagonal boron nitride about 5 parts and a four-component eutectic alloy of gallium, indium, tin and silver about 1 part.

3. A lubricant system adapted to operate at temperatures above 500° F., comprising; bearing surfaces consisting of fused aluminum oxide, a shaft journalled in said bearing having a fused aluminum oxide surface thereon, and a lubricant for said bearing surfaces consisting of an alloy of gallium, indium, tin and silver in minor proportions and hexagonal boron nitride in major proportions.

4. A high temperature lubricant for use with bearing surfaces adapted to operate at temperatures above 500°

F. and taken from the class consisting of glass, ceramics, aluminum oxide and metal carbides, said lubricant consisting of a mixture of hexagonal boron nitride and a gallium base alloy.

5. A high temperature lubricant for use with bearing surfaces adapted to operate at temperatures above 500° F. and taken from the class consisting of glass, ceramics, aluminum oxide and metal carbides, said lubricant consisting of a mixture of about 5 parts of hexagonal boron nitride and about 1 part of an alloy of gallium, indium, silver and tin.

6. A high temperature lubricant for use with a bearing surface consisting of fused aluminum oxide, said lubricant consisting of a mixture of hexagonal boron nitride and a gallium base alloy.

7. A high temperature lubricant for use with a bearing surface consisting of fused aluminum oxide, said lubricant consisting of a mixture of about 5 parts of hexagonal boron nitride and about 1 part of an alloy of gallium, indium, silver and tin.

References Cited in the file of this patent

UNITED STATES PATENTS

| | | |
|---|---|---|
| 2,648,573 | Wheildon | Aug. 11, 1953 |
| 2,700,623 | Hall | Jan. 25, 1955 |

OTHER REFERENCES

"Boron Nitride," written by Finlay and Fetterly, published in American Ceramic Society Bulletin, volume 31, No. 4 (1952), pages 141 thru 143 relied upon.